United States Patent
Blanc et al.

(10) Patent No.: US 8,397,629 B2
(45) Date of Patent: Mar. 19, 2013

(54) ASSEMBLY FOR BEVERAGE PREPARING MACHINE CONTAINING A BOILER

(75) Inventors: Jean-Pierre Blanc, Nice (FR); Alain Goering, Nice (FR)

(73) Assignee: Compagnie Mediterraneenne des Cafes (SA), Carros (FR)

( * ) Notice: Subject to any disclaimer, the term of this patent is extended or adjusted under 35 U.S.C. 154(b) by 547 days.

(21) Appl. No.: 12/602,858

(22) PCT Filed: May 29, 2008

(86) PCT No.: PCT/EP2008/056593
§ 371 (c)(1),
(2), (4) Date: Dec. 3, 2009

(87) PCT Pub. No.: WO2008/148691
PCT Pub. Date: Dec. 11, 2008

(65) Prior Publication Data
US 2010/0175560 A1   Jul. 15, 2010

(30) Foreign Application Priority Data

Jun. 4, 2007  (FR) ...................................... 07 55444

(51) Int. Cl.
*A47J 31/54* (2006.01)
*A47J 31/00* (2006.01)
(52) U.S. Cl. ........ 99/302 R; 99/307; 392/445; 392/444; 392/441; 392/451
(58) Field of Classification Search .............. 99/302 R, 99/307, 306, 304; 392/443, 444, 441, 442, 392/445, 446, 449, 451, 465
See application file for complete search history.

(56) References Cited

U.S. PATENT DOCUMENTS

| | | | |
|---|---|---|---|
| 4,612,090 A * | 9/1986 | Ellis, Jr. ......................... | 202/176 |
| 6,779,435 B1 * | 8/2004 | Iacobucci ..................... | 99/302 R |
| 2004/0076412 A1 * | 4/2004 | Kanzaki et al. ............... | 392/441 |
| 2006/0086256 A1 * | 4/2006 | Heinze ............................ | 99/279 |
| 2008/0271608 A1 * | 11/2008 | Morin ............................. | 99/294 |

FOREIGN PATENT DOCUMENTS

| | | |
|---|---|---|
| DE | 20 2004 015 741 | 12/2004 |
| EP | 0 243 539 | 11/1987 |
| GB | 325770 | 2/1930 |
| GB | 517378 | 1/1940 |

OTHER PUBLICATIONS

International Search Report dated Jun. 15, 2009, from corresponding PCT application.

* cited by examiner

*Primary Examiner* — Reginald L Alexander
(74) *Attorney, Agent, or Firm* — Young & Thompson (57) ABSTRACT

The invention relates to an assembly for a machine for preparing beverages by infusion of a liquid, that includes a holder (10), a boiler (20) for heating the liquid for producing beverages, assembling element (21 *a*,21 *b*, 25) provided so as to selectively allow the connection and removable disconnection of the boiler on the holder (10), a first fluid communication element connected to the boiler (20) and a second fluid communication element connected to a fluid inlet circuit and/or a fluid outlet circuit, the first and second fluid communication element being adapted to interact in order to provide fluid communication between the boiler and a fluid inlet circuit and/or fluid outlet circuit, characterized in that it is adapted so that the connection and the disconnection between the boiler (20) and the holder (10) respectively enables and disables the interaction between the first and second fluid communication element.

14 Claims, 12 Drawing Sheets

ASSEMBLY FOR BEVERAGE PREPARING MACHINE CONTAINING A BOILER

FIELD OF THE INVENTION

This invention concerns a device for making beverages by the infusion of a hot liquid such as hot water.

The invention will apply especially to coffee machines used to make coffee from ground coffee contained, for example but not exclusively, in individual packages also called doses and capsules. The invention applies more especially in the field of Espresso-type coffee machines. It may also be used to make other beverages such as tea.

BACKGROUND OF THE INVENTION

A device for producing beverages by infusion generally consists of a water circuit passing through a boiler to bring the water to the temperature required for its infusion (for example around 100° C.), a pump to extract the material to be infused under pressure and an infusion chamber inside which the matter to be infused is placed and through which circulates the hot water under pressure.

A conventional boiler consists of an assembly incorporating a heating resistance and hot water circuit. This type of boiler needs to be connected to an electrical circuit and a water circuit.

During machine operating cycles, lime scale accumulates in the water circuit. These deposits reduce irremediably the performances of the machine until it stops operating altogether. It is already known that water circuits can be de-scaled using appropriate alkaline products, but unfortunately the general public has discretion as to whether or not to use these harmful products which are difficult and dangerous to handle and require abundant rinsing, without the products discharged by this rinsing operation being controlled properly.

Therefore the boiler has to be regularly dismantled and cleaned or replaced by a clean boiler. These repair and maintenance operations require that the user sends the machine to a specialist. This means that the user is unable to use the machine and this causes inconvenience coupled with a considerable loss of earnings in the case of machines that are used professionally.

In fact, assembly and disassembly current machines are difficult and tiresome. This results in long periods when the machine cannot be used due to repair or maintenance work. These assembly and disassembly operations also lead to considerable fabrication and maintenance costs.

SUMMARY OF THE INVENTION

This invention limits the shortcomings of known boilers and in particular makes it easier for them to be maintained and repaired by specialist professionals thereby guaranteeing their service life, or by the users themselves.

To achieve this goal, this invention concerns an assembly for machines used to make beverages by infusing a liquid comprising a support, a boiler for heating the liquid used to make the beverages, assembly means arranged to allow selective uniting and removable disuniting of the boiler and the support, first fluid communication means joined to the boiler and second fluid communication means joined to an incoming fluid circuit and/or an outgoing fluid circuit, the first and second means of fluid communication being arranged to co-act in order to ensure that the fluid passes between the boiler and the fluid incoming circuit and/or fluid outgoing circuit, the assembly being arranged so that uniting and disuniting of the boiler and the support allow and remove respectively the co-action between the first and second means of fluid communication.

Therefore, the boiler is united to the machine support and connected simultaneously to the water circuits using common steps. Similarly, disuniting the boiler from the support and removal of the fluid communication means between the boiler and the water circuits occurs simultaneously and results from common steps.

Therefore, this invention simplifies significantly assembly and disassembly of the boiler compared to existing machines.

This allows the user to carry out the boiler assembly and disassembly operations himself. As a result, it is no longer necessary to send all the machine to a specialist when maintenance is required, only the boiler needs to be sent. The user is then able to use a replacement boiler that he can assemble on the machine himself after disassembly the first boiler that needs maintenance work.

Machine inoperability will therefore be limited to assembly and disassembly steps performed by the user himself.

Moreover, savings are to be made on the costs of maintenance work and transport of the boiler since these costs are mainly limited to the boiler and not to all the machine.

Moreover, the invention saves considerable time and production and maintenance costs.

Moreover, the system according to the invention will present at least one of the following optional features:
- it is arranged so that the co-action between the first and the second means of fluid communication is obtained by a tight fit of the first fluid communication means to the second fluid communication means,
- it is arranged so that the said uniting of the boiler and the support is obtained by a first translational movement of the boiler relative to the support, followed by a second rotational movement relative to the support,
- it is arranged so that the second rotational movement takes place in an appreciably vertical axis,
- it is arranged so that the second rotational movement takes place in the horizontal axis,
- the support includes a chassis and a shaft fitted to rotate relative to the chassis and arranged so as to be united in a removable manner to the boiler,
- the second means of fluid communication are carried by the shaft, and the shaft accommodates part of the incoming and/or outgoing water circuit,
- the support is arranged so as to prevent any removal of communication between the first and the second means of communication when the boiler and the support are united,
- it includes first and second means of electrical connection joining respectively the boiler to an electrical power supply and able of co-acting one with the other in order to supply the boiler with electricity, and insofar as the uniting or disuniting of the boiler and the support allows and removes respectively co-action between the first and second means of electrical connection,
- the shaft is equipped with a translational stop arranged to ensure the boiler is positioned properly relative to the shaft and that the stop bears the second means of communication.

Moreover, the invention concerns a boiler for use on a machine making beverages by infusing a liquid and comprising:
- assembly means arranged to allow removable uniting of the boiler and a support fixed to the machine, first means of fluid communication arranged so that there is fluid communication between the boiler and an incoming fluid and/or outgoing fluid circuits on the machine, arranged so that its uniting and its disuniting on the machine allows and removes the said fluid communication.

It also concerns a machine for making beverages according to any one of the previous claims.

BRIEF DESCRIPTION OF THE DRAWINGS

The drawings attached are given by way of examples and are not exhaustive. They show only examples of embodiments of the invention and will allow the invention to be easily understood.

DETAILED DESCRIPTION OF THE INVENTION

By reference to FIGS. 1 to 7, a series of beverage preparations is according to the first embodiment have been shown.

Figure 1:
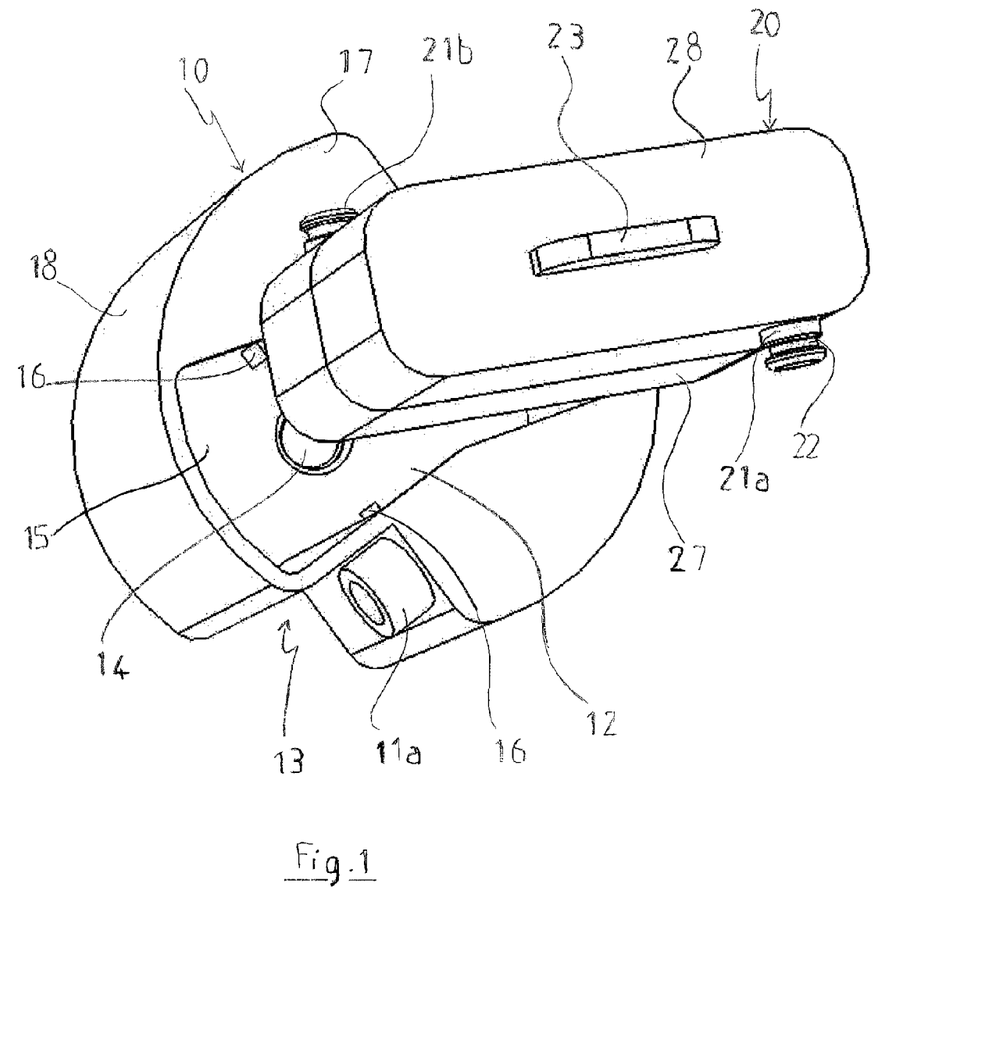
FIG. 1 is a view in perspective of a first example of an embodiment of the invention, on which the boiler and the support are not united one to the other.
Figure 2:
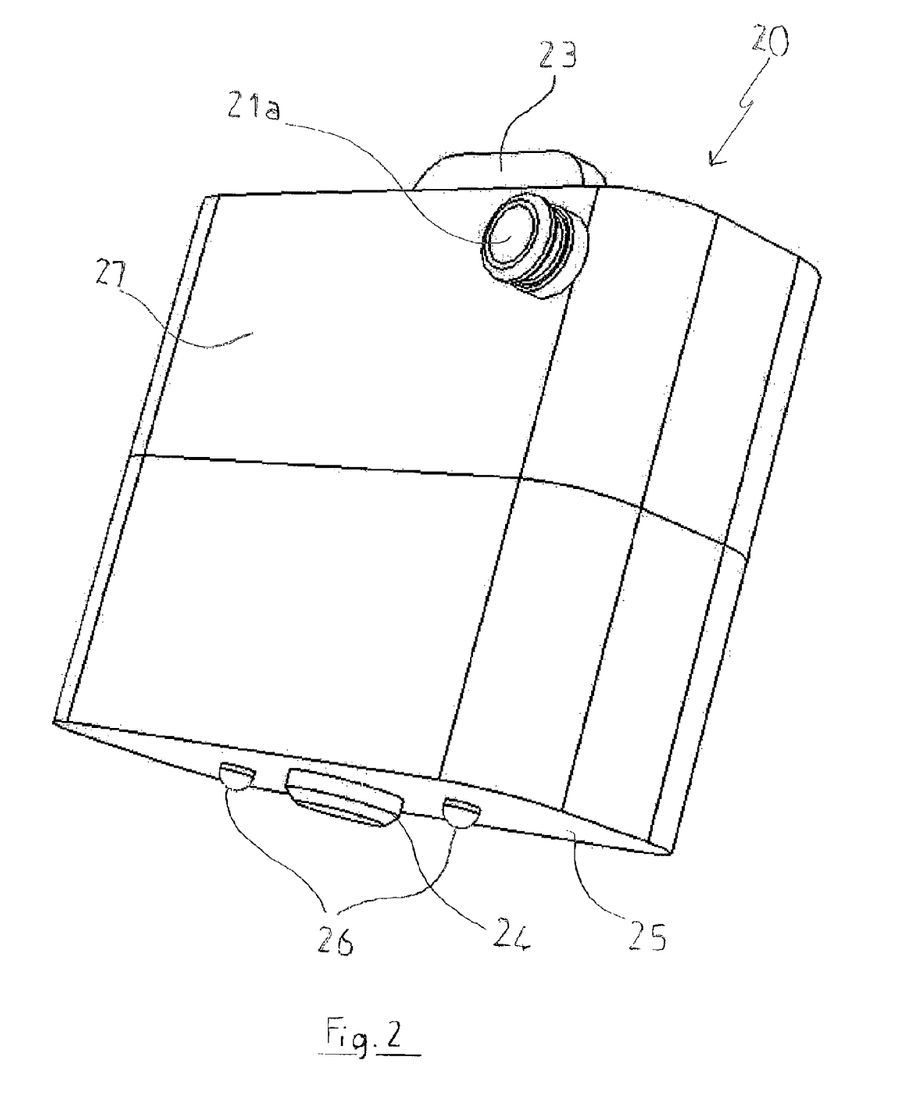
FIG. 2 is a view in perspective of the boiler in the embodiment shown on FIG. 1, FIGS. 3, 4 and 5 are perspective views of the invention's embodiment shown in FIG. 1 during the first phase of boiler and support uniting.

The assembly consists of a boiler 20 and support 10.

Boiler 20 has a body comprising an underside 25, a top 28 and sides 27. Underside 25 is appreciably flat and horizontal and acts as bottom 15 for boiler 20. Top 28 is appreciably parallel to underside 25. Sides 27 extend from underside 25 to top 28, so as to give the body an appreciably parallelepiped shape the angles of which formed by adjoining sides 27 are rounded. The body thus defines an internal volume forming a heating chamber.

Boiler 20 also has heating means joined to the body and able to enter into contact with a liquid such as water in the heating chamber.

Boiler 20 is also equipped with the first means of communication. These first means of communication include male connectors 21a, 21b co-acting respectively with female connectors 11a, 11b on support 10. As will be detailed below, a male connector 21a is designed to ensure that the fluid flows between the chamber and a circuit feeding the water into the chamber, the other male connector 21b being designed to ensure that the fluid flows between the chamber and an outlet circuit evacuating the water outside the chamber.

Male connectors 21a, 21b are arranged on side walls 18 so that each one forms a protuberance extending tangentially from side walls 18 relative to a vertical axis passing through the middle of the underside and top. Hereafter, this axis is called the axis of boiler 20.

Boiler 20 also has a handle 23 fitted on its top 28 to help the operator grip boiler 20.

Support 10 itself constitutes a frame of the machine and can be added on to the latter.

Support 10 has side walls 18 that give the former a generally cylindrical shape defining an axis of support 10.

Support 10 is also equipped with a bottom 15 and cover 17 both extending in the horizontal planes at the respectively lower and upper end planes of side walls 18.

As a result, support 10 forms an inner volume that constitutes a housing.

Cover 17 has an opening 12 the dimensions of which allow boiler 20 to be inserted vertically into support 10. Moreover, these dimensions allow boiler 20 to be guided during this translation relative to support 10.

Moreover, the relative dimensions between boiler 20 and support 10 are such that all the boiler 20 apart from one part at least of handle 23 can be accommodated in the housing.

The assembly has means for rotationally guiding boiler 20 relative to support 10. These guiding means include a male component 24 on boiler 20 and a female component 14 corresponding to the male component 24 on support 10. Male component 24 on underside 25 of boiler 20 forms a roughly circular protuberance centred on the axis of boiler 20. Female component 14 forms a circular void in bottom 15 of support 10 centred on the axis of support 10.

Figure 3:
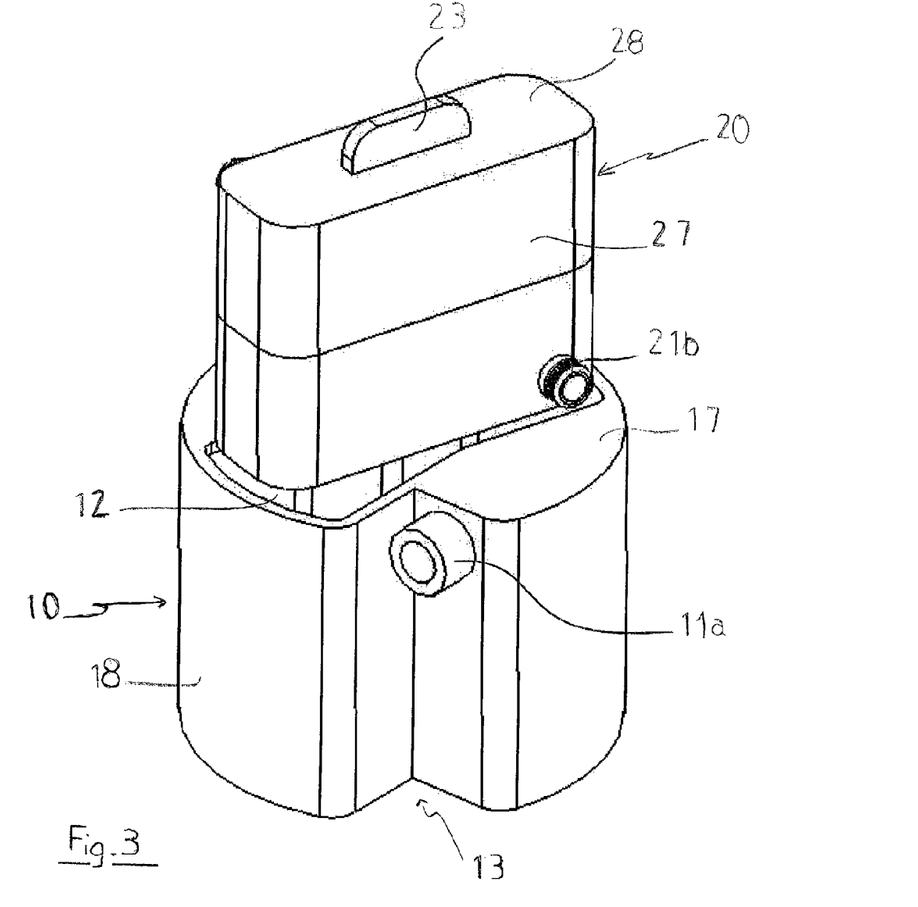
Figure 4:
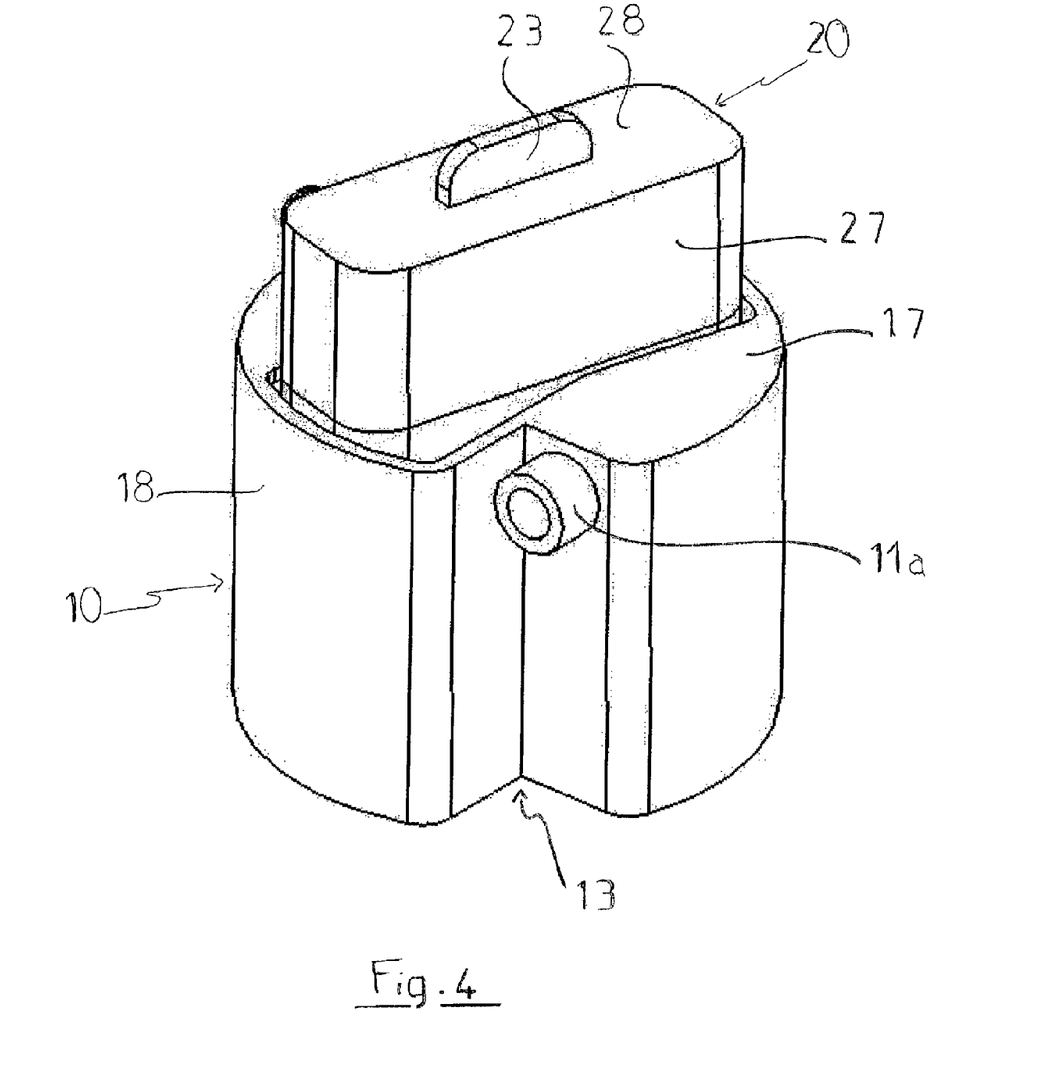

When boiler 20 is inserted in support 10, the male and female components come into contact one with the other and the axes of boiler 20 and support 10 coincide in order to form a common axis. In this position, male component 24 and female component 14 co-act in order to rotationally guide boiler 20 in this common axis relative to support 10.

This results in rotational movement taking place around an axis that is appreciably parallel to the direction around which translation takes place.

Side walls 18 of support 10 have two discontinuities each one forming a recess 13 extending inwards from the outer perimeter of the cylinder. These recess 13 each form a protuberance inside the housing. These two recess 13 are appreciably symmetrical one relative to the other in the axis of support 10.

Each one of these protuberances forms a stop for boiler 20 rotation in the common axis.

In the example shown, recess 13 has two appreciably flat and vertical surfaces extending from bottom 15 up to cover 17. These two surfaces are adjoining and extend inwards to form an approximate right angle inside the housing. A first surface of recess 13 consisting of a stop resisting rotation of the boiler 20 in the so-called disengaging direction relative to support 10 when boiler 20 is inserted in the housing.

A second surface of recess 13 is fitted with second means of communication each one forming communication between the outside and the is inside of the housing. These second means of communication are able to co-act with an incoming and outgoing water circuit and with first boiler 20 means of communication.

To this end, the part of the second means of communication positioned opposite the outside of the housing is arranged so as to form a leaktight connection with the water pipes.

Moreover, the part of the means of communication arranged opposite the inside of the housing forms a female connector 11a, 11b that corresponds to a male connector 21a, 21b and is able to act with the latter to former a leaktight and mechanically stable connection between boiler 20 and support 10.

Figure 5:
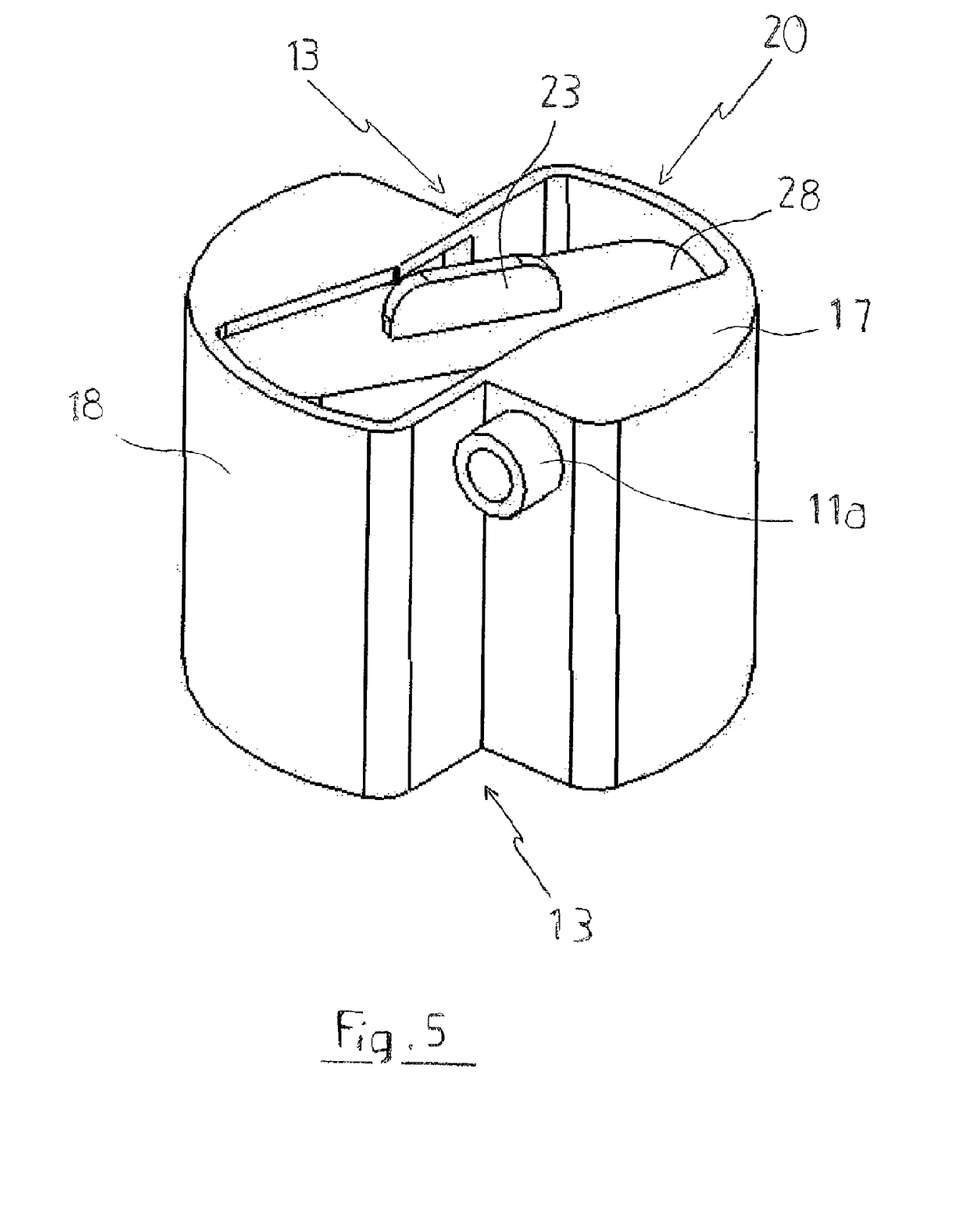

The assembly is arranged so that when boiler 20 is turned relative to support 10 in the so-called engaging direction, male connectors 21a, 21b are respectively arranged opposite female connectors 11a, 11b and are able to co-act with the latter in order to create fluid flow between the heating chamber and the incoming and outgoing circuits connected to the second means of communication.

In order to ensure that there is leaktight co-action between the first and second means of communication, a preferred arrangement will be for female connectors 11a, 11b to form a bore and male connectors 21a, 21b to form a hollow cylinder able to penetrate female connectors 11a, 11b. Moreover, each male connector 21a, 21b may be equipped with a throat 22 to accommodate an o-ring.

Boiler 20 is arranged so as to turn in the engaging direction relative to support 10 until reaching the engaged position in which at least one side 27 being stopped against one of the second walls forming recess 13 or against female connectors 11a, 11b. As a result, the engaging position may be formed by a stop in female component 14 which the end of corresponding male connector 21a, 21b is designed to come into contact with.

This engaging position is obtained by a tight fit of the first means of communication to the second means of communication.

Figure 6:
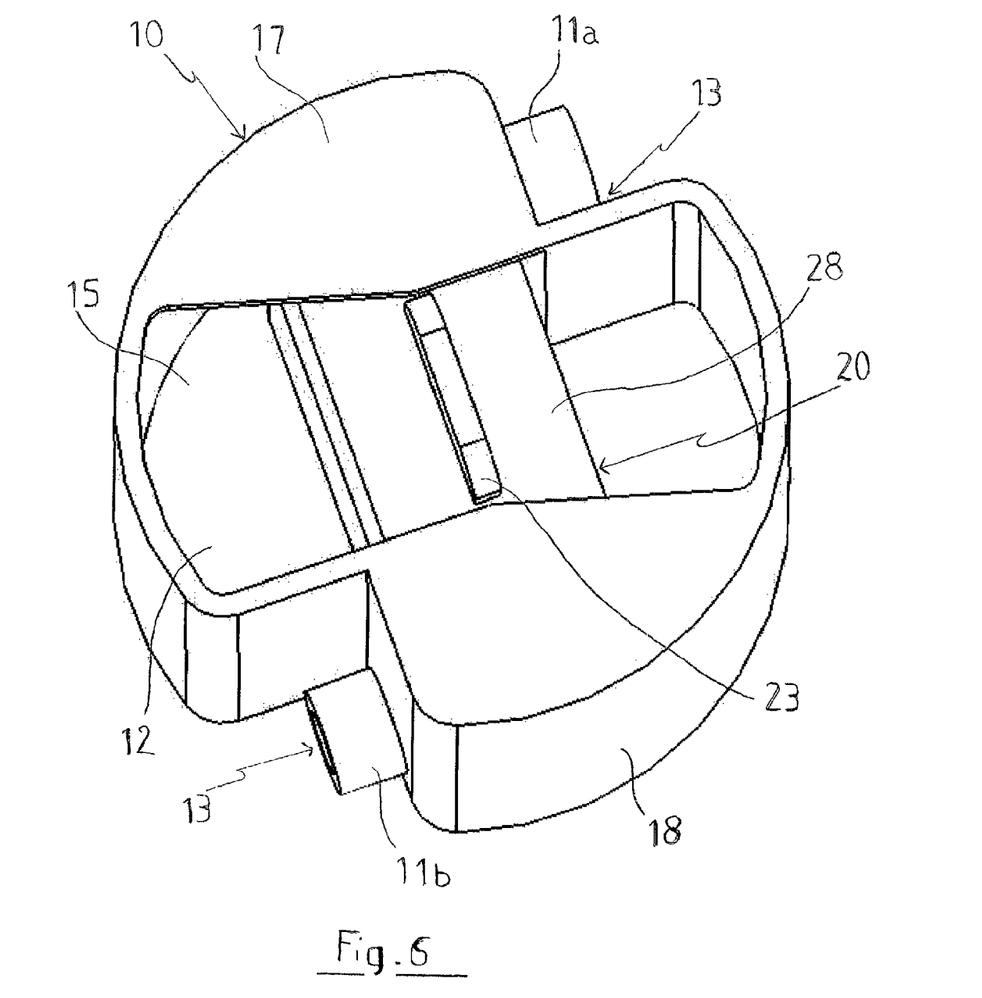
FIGS. 6 and 7 are perspective views respectively from above and below the assembly according to the example in FIG. 1, the boiler and the support being united one to the other.
Figure 7:
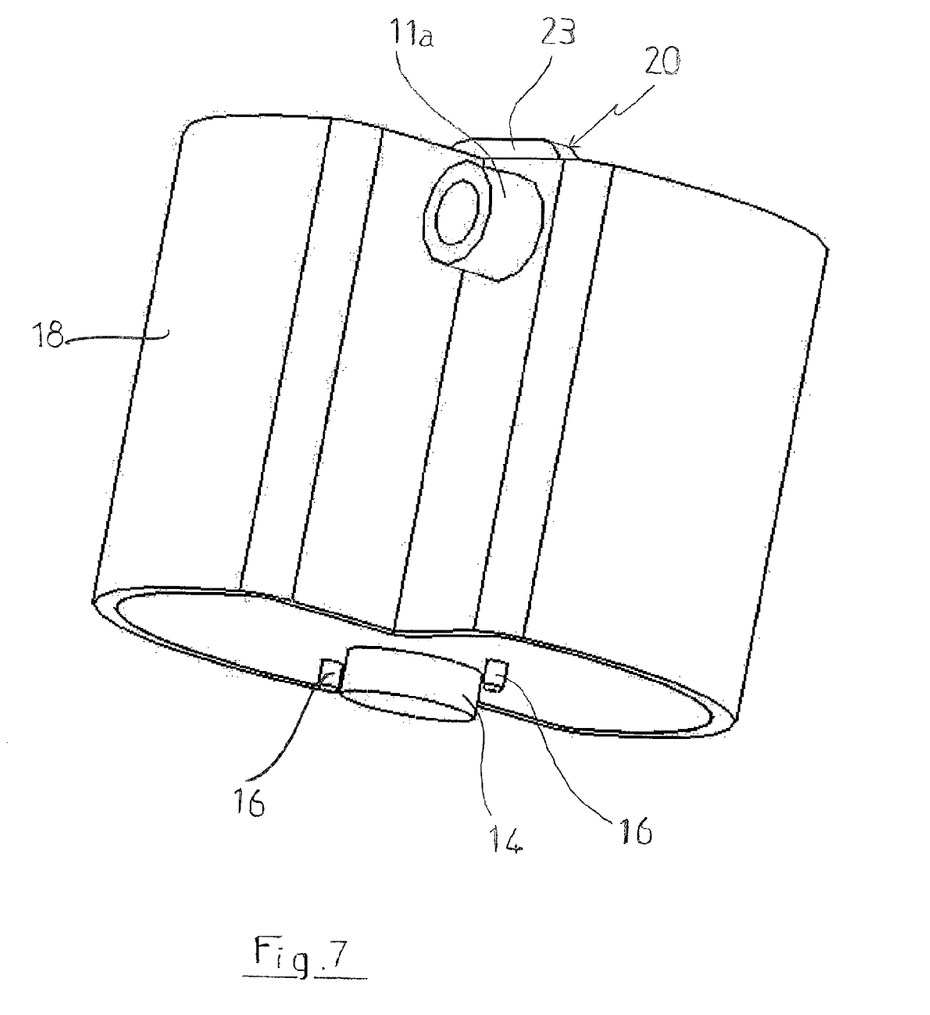

In this position, underside 25 of boiler 20 rests flat on bottom 15 of support 10 and cover 17 prevents any vertical removal of boiler 20 out of support 10.

Underside 25 of boiler 20 and the first means of communication co-act respectively with bottom 15 of support 10 and the second means of communication in order to ensure that boiler 20 is installed and united to support 10. In this embodiment, underside 25 of boiler 20, the first means of communication, and bottom 15 of support 10 and the second means of communication form means of assembly arranged so as to allow either the uniting or disuniting of boiler 20 and support 10. In this way, the means of communication contribute to uniting boiler 20 and support 10.

This engaging position ensures that boiler 20 is held on support 10 in a particularly stable and reliable manner. It also ensures that fluid communication between boiler 20 and the incoming and outgoing water circuits connected to the latter remain particularly stable.

This stability is obtained particularly easily. In fact, the following steps are sufficient to assemble boiler 20:
  underside 25 of boiler 20 is positioned at the level of the opening,
  boiler 20 is inserted through opening 12 in the axis of support 10,
  boiler 20 is rotated on this axis in the engaging direction until the first and second means of communication co-act and are tight fit one in the other.

Moreover, the disassembly of the boiler 20 relative to support 10 is performed by the following easy and sufficient steps:
  boiler 20 is rotated on the access of support 10 in the disengaging direction until top 28 of boiler 20 is positioned opposite the opening.
  boiler 20 is withdrawn vertically through the opening in the axis of support 10.

Assembly and disassembly of boiler 20 and support 10 can be carried out in this way by the user himself without recourse to a specialist.

The assembly is also equipped with the first electrical connection means 26 on boiler 20 and second electrical connection means 16 on support 10.

The first connection means 26 include a first and second contactor arranged so as to be respectively in contact with the first and second contactor on the second electrical connection 16 when boiler 20 is in the engaged position.

As an advantageous measure, second means of electrical connection 16 are positioned on bottom 15 of support 10 and the first means of connection are positioned on the underside 25 of boiler 20.

First means of connection 26 are electrically connected to the heating element of boiler 20. The second means of connection 16 are electrically connected to an electrical supply circuit. Therefore, boiler 20 is supplied with electricity in the engaged position.

As a consequence, the invention is able to ensure the mechanical stability, fluid communication and electrical connection of boiler 20 in a particularly simple manner. This assembly is removable and achieved particularly easily and quickly without the need for a tool and associated assembly means such as nuts and bolts. Boiler 20 can therefore be interchanged and this makes it possible to limit machine downtime. This assembly according to the invention will advantageously lead to lower machine production and maintenance costs.

In a variant of this embodiment, the rotational guiding means may consist of a male component 24 on support 10 and a female component 14 on boiler 20.

In a variant of the embodiment described above, a valve may be used to close the opening.

In a variant of the embodiment described above, two male connectors 21a, 21b are installed on a same side 27 of boiler 20. Measures may also be taken so that support 10 only has one recess 13 on which are installed the two female connectors 11a, 11b.

In a variant of the embodiment described above, two male connectors 21a, 21b are arranged on underside 25 of boiler 20. Measures may also be taken for female connectors 11a, 11b to be positioned at the level of opening 12 to and placed opposite male connectors 21a, 21b respectively when the boiler is positioned at the level of opening 12. The assembly includes assembly means ensuring firm and tight contact between male connectors 21a, 21b and female connectors 11a, 11b. These assembly means may be formed by the male and female connectors themselves. They may also be formed by a specific engaging device consisting of retractable or flexible triggers on the support and inserting in a removable manner into an engagement stop formed by boiler 20 in order to maintain the latter in position relative to support 10. This engagement stop may be formed by an aperture or a specific protuberance, or by one of sides 25, 27, 28 of boiler 20. In such an embodiment, boiler 20 and support 10 are arranged so that they can be assembled together using the following steps:
  lower face 25 of boiler 20 is arranged opposite opening 12 made in support 10,
  boiler 20 is inserted by a translational movement through opening 12 until the engaging means have united boiler 20 to support 10 and made a firm contact between male connectors 21a, 21b and corresponding female connectors 11a, 11b.

The advantage of this variant is that it makes assembly and the disassembly particularly easy.

Locking means may also be provided to selectively prevent and allow disengagement of boiler 20 and support 10. These locking means are preferably arranged at opening 12 so that they may close or open. These locking means may take the form of a removable flap valve or catch fitted to rotate or translate on support 10.

The invention is not limited to the variants of this first embodiment described above as illustrative examples, but also extends to boilers in which the axis of support 10 and the axis of boiler 20 are not vertical when boiler 20 is united to support 10. Indeed, these axes may be oblique or horizontal.

The translational movement always takes place in the axis of support 10. The rotational movement takes place around an axis that is appreciably parallel to the direction of translation.

A second embodiment will now be described by reference to FIGS. 8 to 12.

Figure 8:
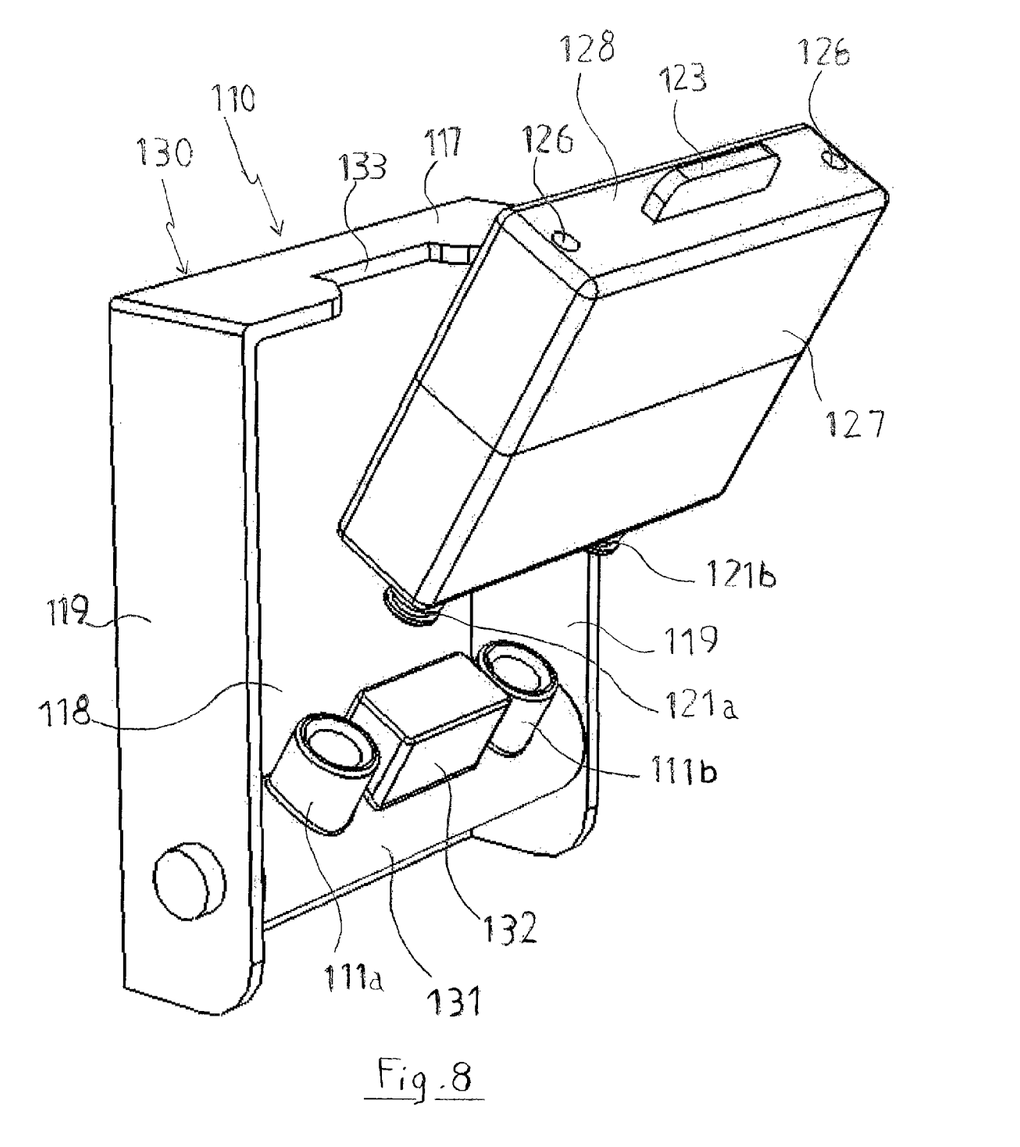
FIG. 8 is a perspective view of a second embodiment of the invention, the boiler and the support being united one to the other.

Boiler 120, apart from the arrangement of the first fluid communication means and the first electrical communication means, has appreciably the same characteristics as boiler 120 described in the first example of the embodiment of this invention. Thus, boiler 120 has an underside, a top 128 and sides 127 forming a heating chamber. Top 128 of boiler 120 has a handle 123 designed to assist the user to grip boiler 120.

Figure 9:
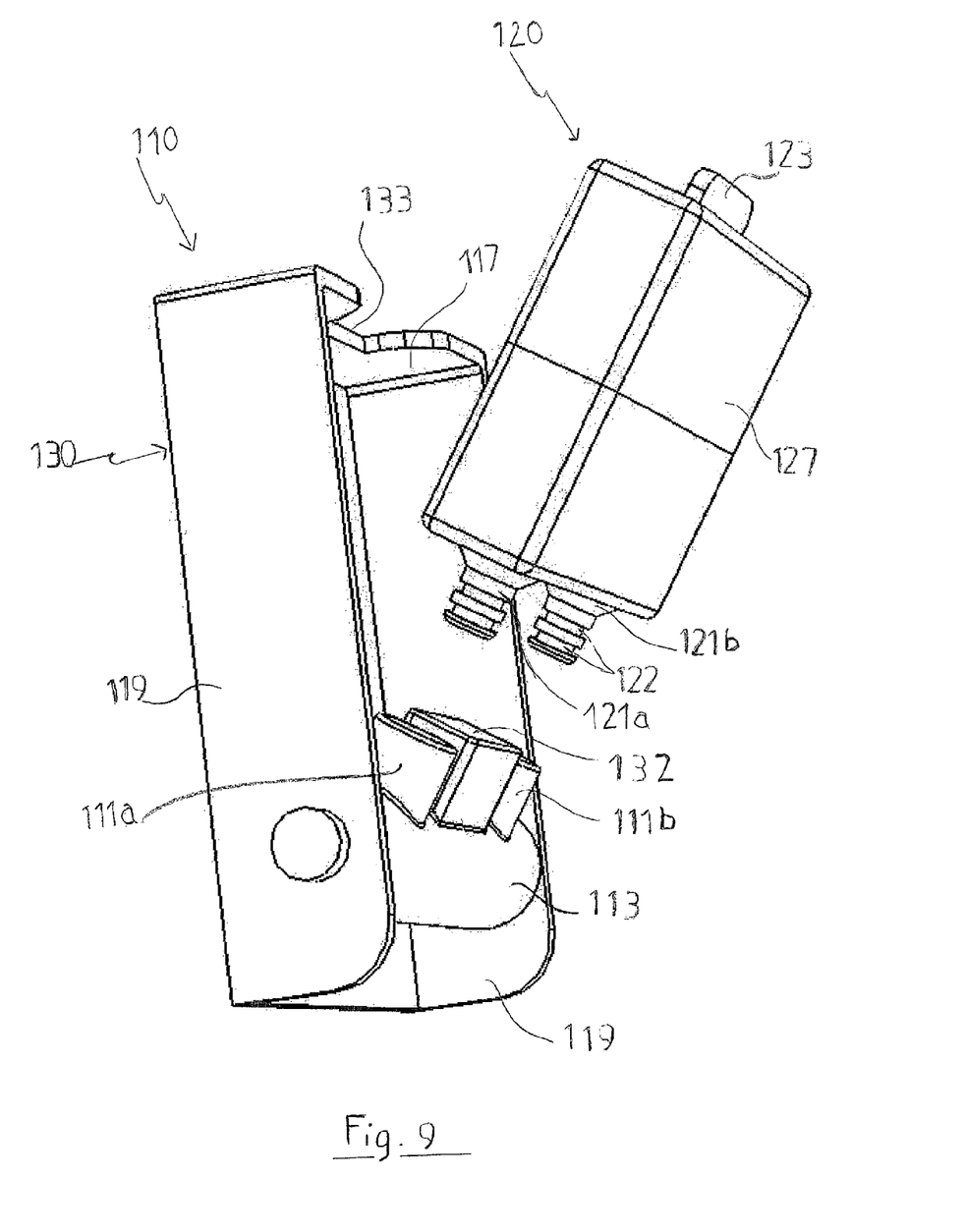
FIGS. 9 to 12 are perspective views of the embodiment shown on FIG. 8 during the different phases of boiler assembly in the support.

The first means of communication are arranged on underside 125. They form male connectors 121a, 121b, each one forming a protuberance and defining a hollow cylinder extending from underside 125 in a normal line direction to the latter.

Two male connectors 121a, 121b constitute the ingoing and outgoing respectively of water in boiler 120. Advantageously, they are arranged to be considerably apart one from the other.

Support 110 has a shaft 131 and a chassis 130 arranged so as to act as a bearing for shaft 131 fitted to rotate on chassis 130 according to a horizontal axis designated hereafter as the rotational axis. Shaft 131 is hollow and forms an aperture extending over all its length.

Shaft 131 has two fluid communication means defining female connectors 111a, 111b. Each female connector 111a, 111b forms a hollow cylinder extending from shaft 131 in a direction radial to the latter.

Two pipes housed partly in the aperture in shaft 131 respectively ensure that the fluid flows between first female connector 111a and an incoming water circuit, and second female connector 111b and a water outgoing circuit.

Figure 10:
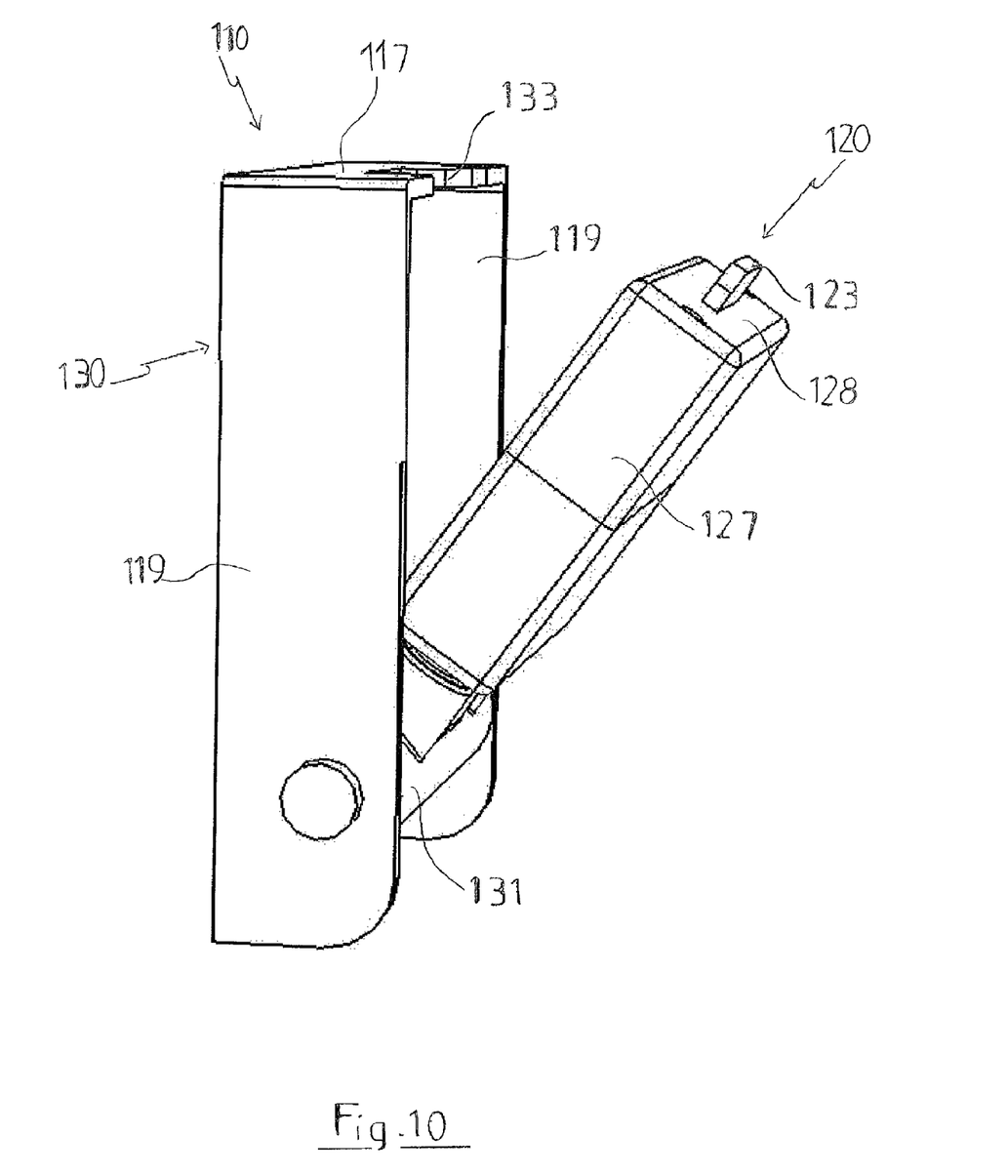

The first and second means of communication are arranged so that male connectors 121a, 121b are able to penetrate female connectors 111a, 111b by inserting shaft 131 into boiler 120. This co-acting of the first and second means of communication provides fluid communication between boiler 120 and the machine incoming and outgoing water circuits.

The assembly is arranged so that the uniting of boiler 120 and support 110 takes place by the translation of boiler 120 relative to shaft 131 in a direction radial to the latter. This ensures that rotational movement takes place around an axis that is appreciably perpendicular to the direction of translational movement. Advantageously, this translation takes place in an inclined direction of between 30 and 60° relative to the vertical.

A stop 132 in translation on shaft 131 that is intended to come into contact with underside 125 in order to stop translation of boiler 120 relative to shaft 131 may be provided on the latter. When stop 132 comes into contact with underside 125, boiler 120 is in a so-called engaged position.

Figure 11:
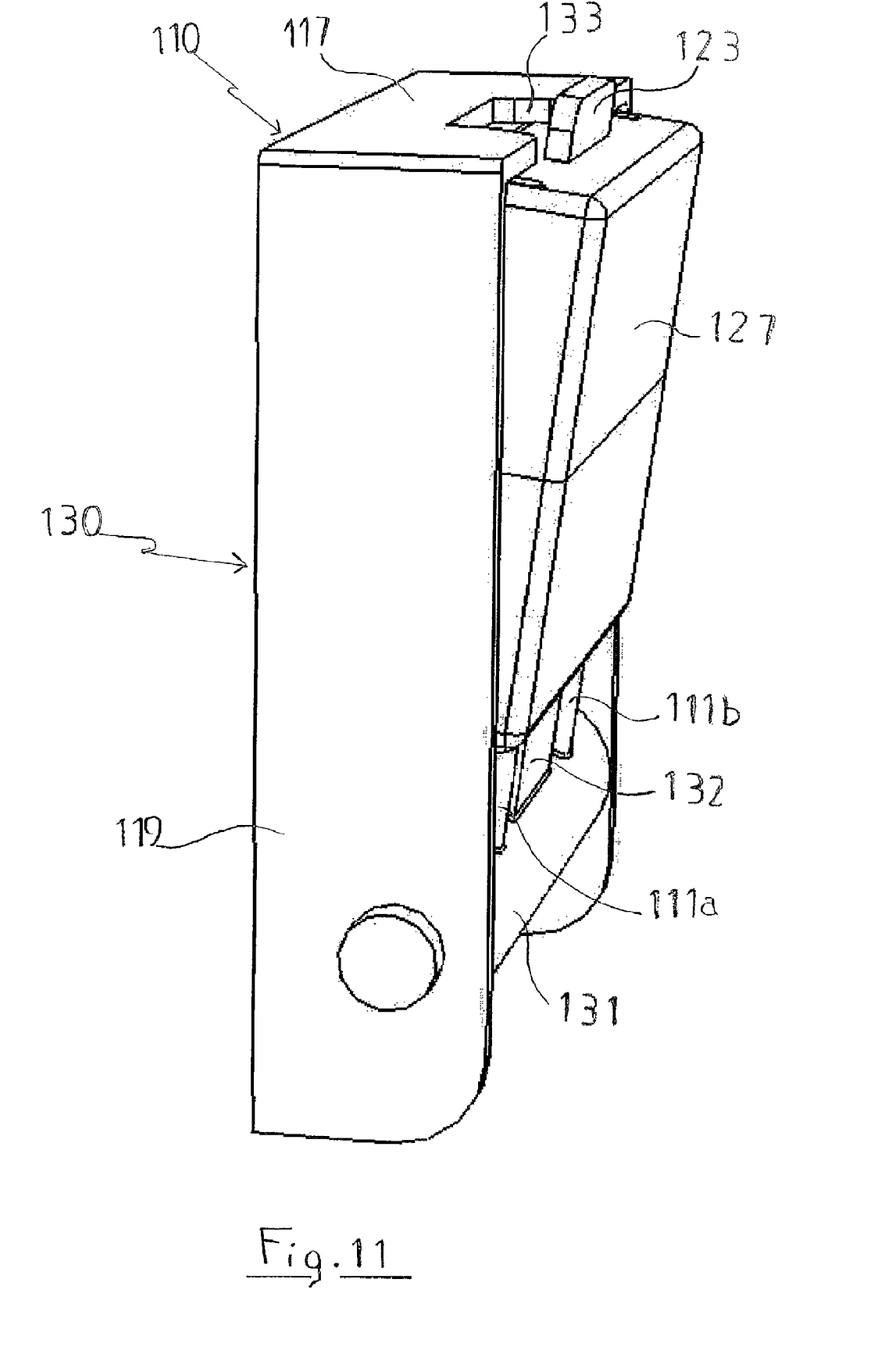

In this engaged position, boiler 120 is able to freely rotate around the rotational axis on a given angular part.

Figure 12:
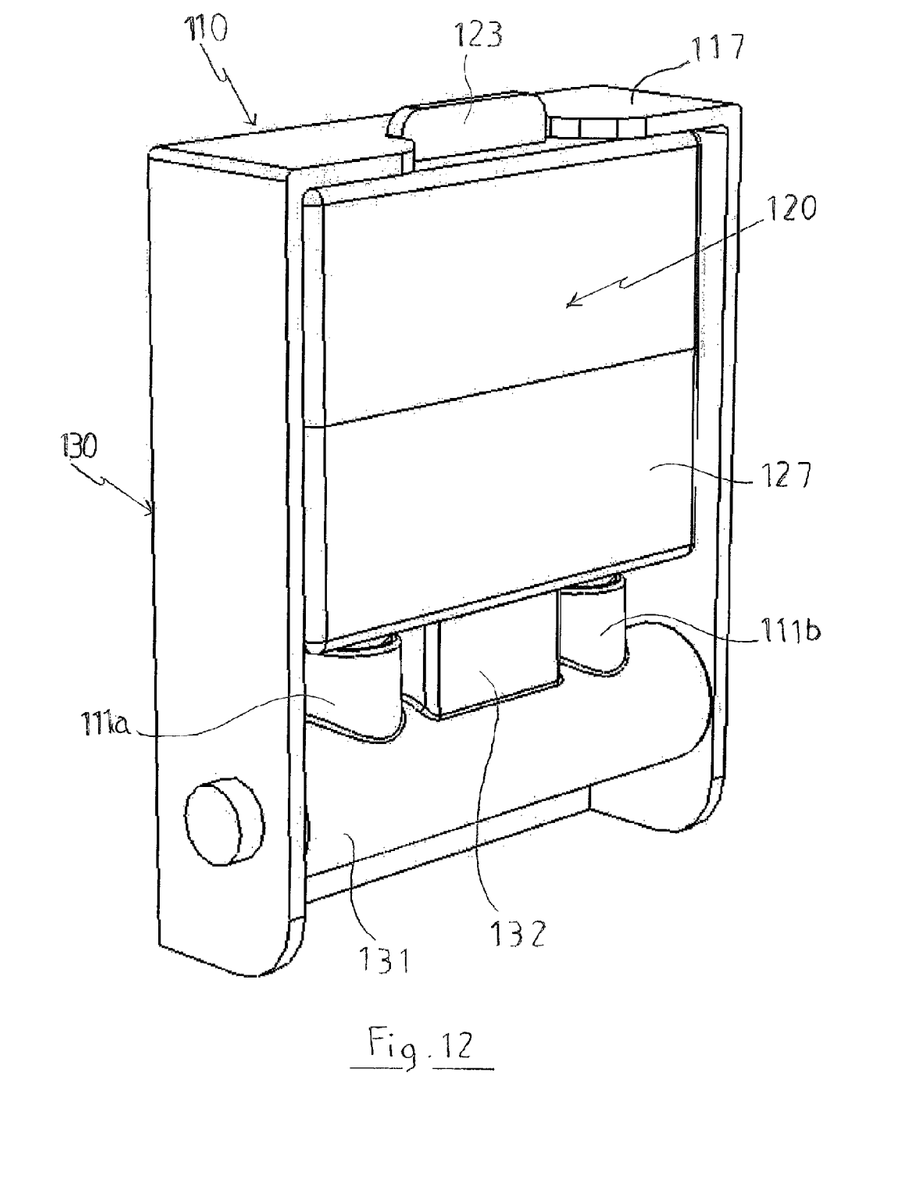

Chassis 130 is equipped with a rotational stop arranged so as to stop the rotation of boiler 120 when this is positioned appreciably vertically above shaft 131.

In this position, boiler 120 is assembled on the support.

Chassis 130 has two flanges that are appreciably flat and vertical, extending the bearings, and spreading each one in a plane that is appreciably perpendicular to the axis of rotation. Chassis 130 also has a flat and vertical side wall extending from one flange to the other. It also has a cover 117 on its upper end adjoining the side wall and extending horizontally from one flange to the other.

Cover 117 has a notch 133 designed to receive handle 123 of boiler 120 when in the assembled position.

The rotational stop consists of notch 133 which handle 123 comes into contact with on rotation of boiler 120.

According to one embodiment, the rotation stop consists of the side wall of chassis 130 which side 127 of boiler 120 comes into contact with on rotation of the latter.

The respective dimensions of support 110 and boiler 120 are chosen so that in the assembled position, boiler 117 acts as translational stop preventing any withdrawal or disengagement of male connectors 121a, 121b from female connectors 111a, 111b. The movement of boiler 120 relative to shaft 131 is stopped by top 128 coming into contact with cover 117.

Therefore, even if the pressure of the water circulating between boiler 120 and the incoming and outgoing circuits applies substantial force tending to break the engagement of boiler 120 on shaft 131, any risk of a disengagement between these two latter components is overcome by the arrangement of cover 117.

This embodiment provides considerable mechanical stability and excellent tightness of the fluid connection. Moreover, it permits particularly simple and fast assembly and disassembly of boiler 120 relative to support 110.

The assembly includes the two first means of electrical connection 126 positioned on underside 125 and second means of electrical connection 116 positioned on translational stop 132 so that it comes into contact with the first means of connection 126 when boiler 120 is engaged on shaft 131. The second means of connection 116 are electrically connected to an electrical supply circuit by wires or electrical tracks housed in the aperture of shaft 131.

In a variant embodiment, first means of connection 126 can be arranged on top 128 of boiler 120 and second means of connection 116 are arranged on cover 117 of support 110. In this variant, boiler 120 and the feed are electrically connected electrically when boiler 120 is in the assembled position.

In a variant embodiment, the second means of connection 116 may be arranged on the side wall of support 110 and the first means of connection 126 are on side 127 arranged opposite the side wall when boiler 120 is in the assembled position.

The assembly of boiler 120 on support 110 takes place through the following steps:

boiler 120 is inclined at an angle of between 20 and 70° relative to a horizontal that coincides appreciably with the rotational axis of shaft 131 so that each male connector is arranged opposite a female connector, boiler 120 is translated relative to support 110 so that there is co-action between the first and second means of communication, boiler 120 is applied on chassis 130 by turning it towards the latter around the axis of rotation until boiler 120 being stopped by against the rotational stop.

Thus, this example of the embodiment ensures the uniting of boiler 120 to on the support, creates fluid communication between boiler 120 and the water incoming and outgoing circuits and the electrical connection of boiler 120 to a power supply using simple, quick steps that require no tools or assembly accessories.

Boiler 120 and the first means of communication 126 co-act respectively with the side wall of support 110 and the second means of communication 116 in order to ensure the positioning and fixing of boiler 120 on support 110. In this embodiment, boiler 120, first means of communication 126, the side wall of support 110 and second means of communication 116 form assembly means arranged so as to allow selective uniting and disuniting of boiler 120 on support 110. Thus, the means of communication contribute to uniting boiler 120 and support 110.

In a variant of this second embodiment, the electrical wires and the water pipes are installed in one or several grooves made in shaft 131.

The invention is not limited to the variants of this second embodiment described above as examples illustrating the invention and extends notably to boilers in which the rotational axis is not horizontal but is sloping or vertical.

The translational movement always takes place in a direction that is appreciably radial to the rotational axis. Thus, the rotational movement takes place around an axis that is appreciably perpendicular to the direction of the translational movement.

In a variant, support 110 may include appropriate locking means allowing selective locking and unlocking of boiler 120 on support 110 in the assembled position. These locking means may include in particular a pin acting as the rotational stop for boiler 120.

Advantageously, the assembly is arranged so that the angular movement of boiler 120 required for the assembly or disassembly of the latter and support 110 is between 30 and 60°.

The present invention is not limited to the embodiment described above but extends to all embodiments conforming to this spirit.

REFERENCES

1$^{st}$ Embodiment

10. Support
11a. Female connector
11b. Female connector
12. Opening
13. Recess
14. Female component
15. Bottom
16. Second means of electrical connection
17. Cover
18. Side wall
20. Boiler
21a. Male connector
21b. Male connector
22. Throat
23. Handle
24. Male component
25. Underside
26. First means of connection
27. Side
28. Top 2$^{nd}$ Embodiment 110. Support
111a. Female connector
111a. Female connector
112. Opening
113. Recess
115. Bottom
116. Second means of electrical connection
117. Cover
118. Side wall
119. Flange
120. Boiler
121a. Male connector
121a. Male connector
122. Throat
123. Handle
125. Underside
126. First means of connection
127. Side
128. Top
130. Chassis
131. Shaft
132. Stop in translation
133. Notch

The invention claimed is:

1. An assembly for use in a machine for preparing beverages by infusing a liquid, the assembly comprising:
   a support;
   a boiler, used to heat the liquid for making the beverages, the boiler comprising a heating chamber and heating means for heating the liquid contained in the heating chamber;
   assembly means arranged so as to allow either uniting or removable disuniting of the boiler and support;
   first means of fluid communication into the boiler and second means of fluid communication formed by the support, the second means of fluid communication forming an integral part of a fluid incoming circuit for feeding liquid into the heating chamber and forming an integral part of a fluid outgoing circuit for evacuating the liquid heated in the heating chamber outside the heating chamber, said first and second means of fluid communication being arranged to co-act one with the other so that when the boiler is united on the support:
      the liquid can flow from the fluid incoming circuit of the support to the boiler, and
      the liquid heated in the heating chamber can flow from the heating chamber of the boiler to the fluid outgoing circuit of the support,
   wherein uniting and disuniting the boiler and the support respectively allows and removes co-action of the first means of fluid communication with the second means of fluid communication, and
   said uniting of the boiler and the support is achieved by imposing a first translational movement on the boiler relative to the support, then a second rotational movement relative to the support.

2. The assembly according to claim 1, wherein co-action between the first and second means of fluid communication is achieved by a tight fit of the first means of fluid communication to the second means of fluid communication.

3. The assembly according to claim 1, wherein the boiler is rotated such that the rotational movement takes place around an axis that is appreciably parallel to the translational movement.

4. The assembly according to claim 1, wherein the boiler is rotated such that the rotational movement takes place around an axis that is appreciably perpendicular to the translational movement.

5. The assembly according to claim 1, wherein the support includes a chassis and a shaft assembled to rotate relative to the chassis, the shaft being arranged so as to be united in a removable manner to the boiler.

6. The assembly according to claim 5, wherein the second means of fluid communication are carried by the shaft, the shaft accommodating part of the water incoming and outgoing circuit.

7. The assembly according to claim 6, wherein the support is arranged so as to prevent any removal of fluid communication between the first and the second means of communication when the boiler and the support are united.

8. The assembly according to claim 1, further comprising first and second means of electrical connection connected respectively to the boiler and an electrical power supply and able to co-act to supply the boiler with electricity and in that uniting and disuniting the boiler and the support allows and removes respectively co-action between the first and the second means of electrical connection.

9. A machine for making beverages comprising an assembly according to claim 1, a pump to extract material to be infused under pressure, and an infusion chamber inside which the material to be infused is received and through which circulates the heated liquid in the assembly under pressure.

10. The assembly according to claim 1, wherein the boiler and the support are configured such that the boiler is configured to be received into the support to achieve the translational movement relative to the support.

11. The assembly according to claim 10, wherein the boiler is configured to rotate within the support to achieve the rotational movement relative to the support after the boiler is inserted into the support.

12. A boiler for use in a machine for preparing beverages by infusing a liquid, the boiler comprising:
   a heating chamber;
   a heating means for heating the liquid contained in the heating chamber;
      assembly means arranged to allow uniting and removable disuniting of the boiler and a support fixed to the machine,
      first means of fluid communication arranged to: allow fluid communication between the boiler and a fluid incoming circuit on the machine for feeding the liquid into the heating chamber and to allow fluid communication between the boiler and a fluid outgoing circuit on the machine for evacuating the liquid outside the heating chamber,
   wherein the boiler units to and disunites from the machine to respectively allow and remove said fluid communication, and said uniting of the boiler and the support is achieved by applying to the boiler a first translational movement relative to the support, then a second rotational movement relative to the support, and
   the boiler is configured so that when the boiler is united on the support:
      the liquid can flow from the fluid incoming circuit of the support to the heating chamber of the boiler, and
      the liquid heated in the heating chamber can flow from the heating chamber of the boiler to the fluid outgoing circuit of the support.

13. The boiler according to claim 12, wherein the boiler is configured to be received into the support to achieve the translational movement relative to the support.

14. The assembly according to claim 13, wherein the boiler is configured to rotate within the support to achieve the rotational movement relative to the support after the boiler is inserted into the support.

* * * * *